April 5, 1927.

C. A. BROWN ET AL 1,623,825

BULB FEEDING APPARATUS

Filed March 24, 1925   2 Sheets-Sheet 1

INVENTORS:
CARL A. BROWN,
FRANK B. VAN SICKLE,
BY
THEIR ATTORNEY.

April 5, 1927.
C. A. BROWN ET AL
1,623,825
BULB FEEDING APPARATUS
Filed March 24, 1925    2 Sheets-Sheet 2
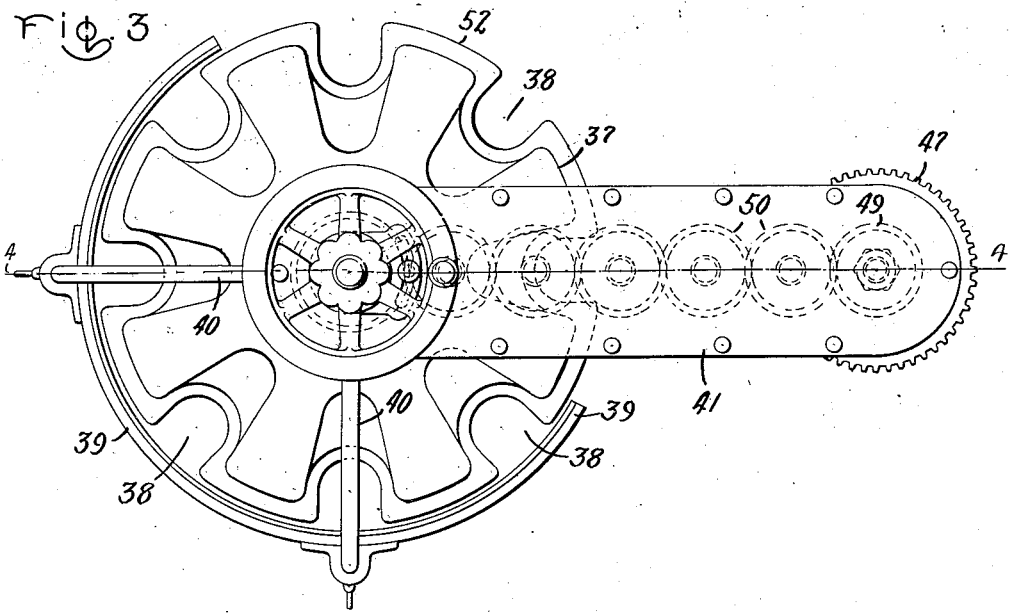
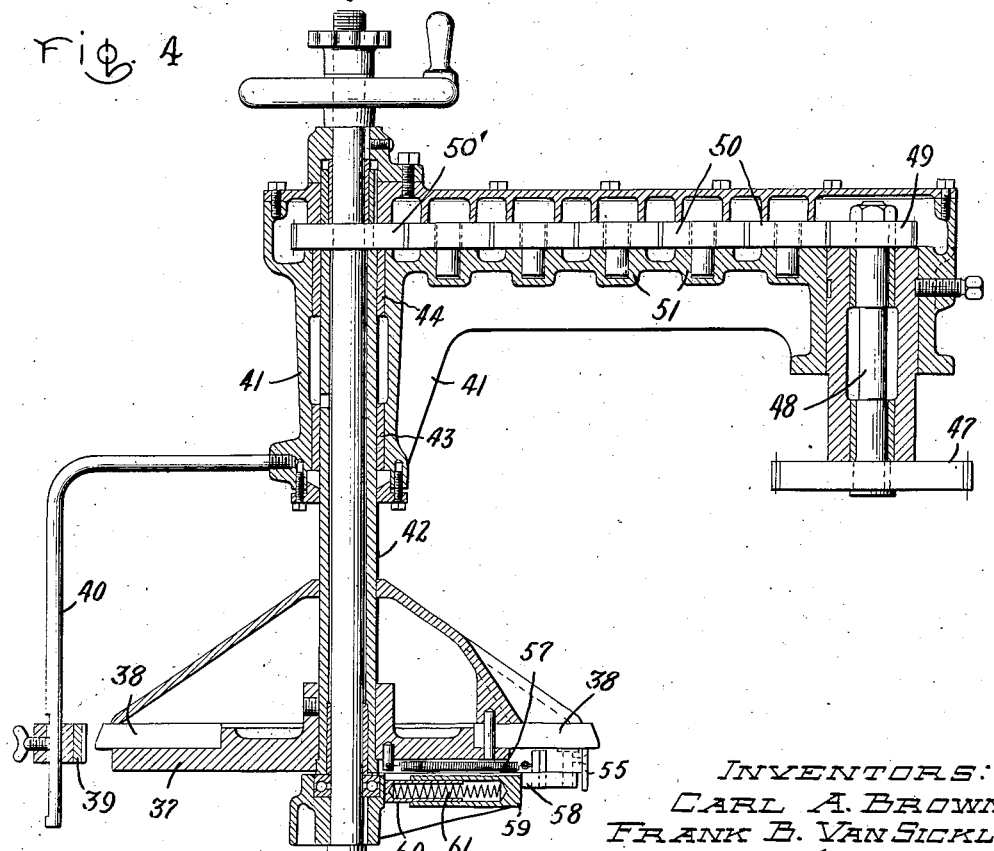
INVENTORS:
CARL A. BROWN,
FRANK B. VAN SICKLE,
BY
THEIR ATTORNEY Patented Apr. 5, 1927.

1,623,825

UNITED STATES PATENT OFFICE.

CARL A. BROWN, OF EAST CLEVELAND, AND FRANK B. VAN SICKLE, OF WICKLIFFE, OHIO, ASSIGNORS TO GENERAL ELECTRIC COMPANY, A CORPORATION OF NEW YORK.

BULB-FEEDING APPARATUS.

Application filed March 24, 1925. Serial No. 18,044.

Our invention relates to an apparatus for conveying glass blanks such as electric incandescent lamp bulbs and similar articles from a glass blank forming machine to a finishing machine such, for example, as that shown and described in Burrows Patent, 1,404,268, issued January 24, 1922. The said machine comprises a number of holders mounted upon a rotatable carrier, each holder being adapted to receive a bulb and to carry it by certain devices which effect the cutting off of a surplus portion of the neck.

Figure 1:
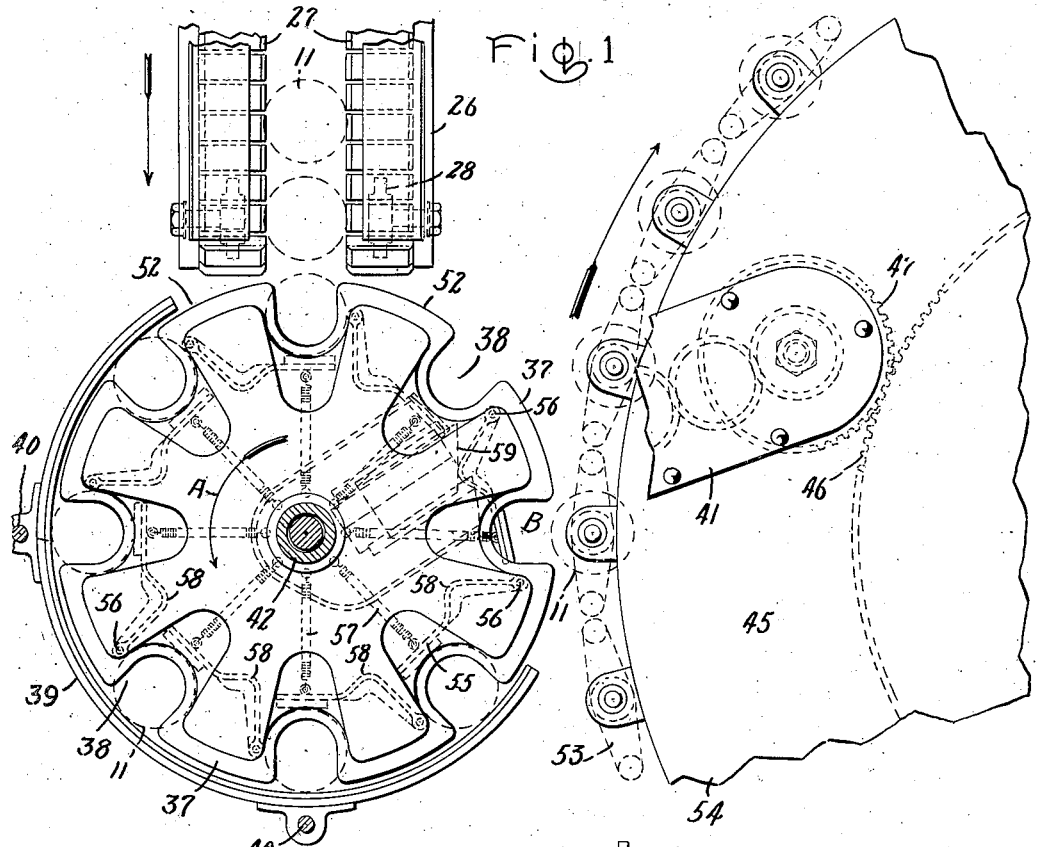
Figure 2:
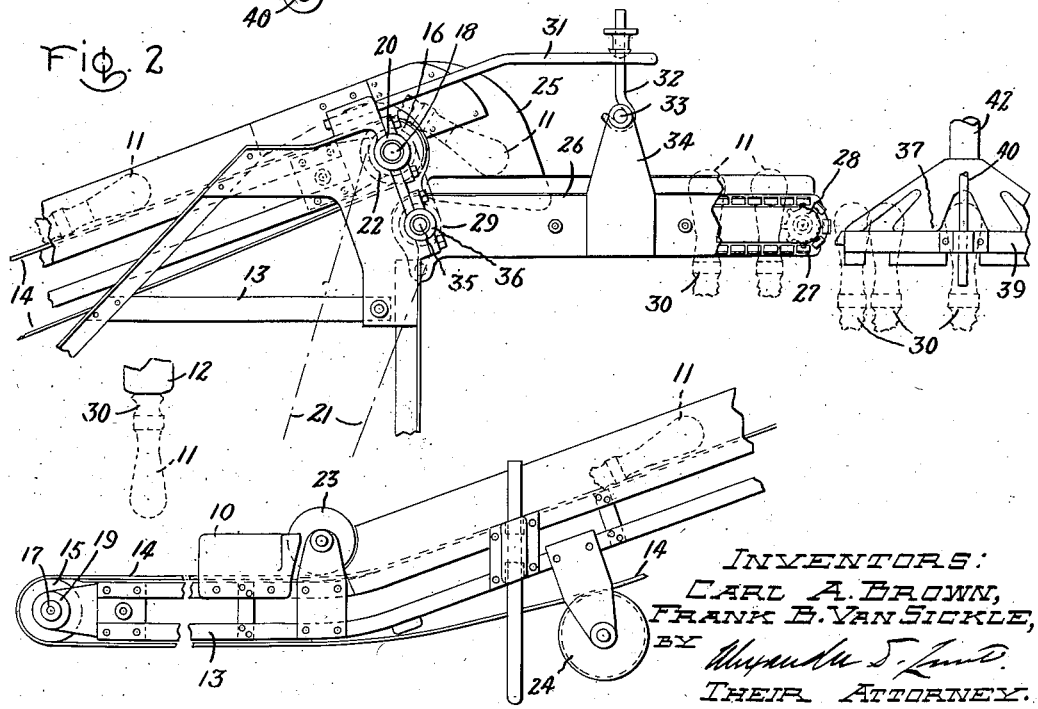

Referring to the accompanying drawings wherein is illustrated a species of our invention, Fig. 1 is a plan view partially in section of our feeding machine shown in connection with a glass finishing machine; Fig. 2 is a fragmentary side elevation diagrammatically shown; Fig. 3 is a plan of the feeding machine; and Fig. 4 is an elevation in section along the line 4—4 of Fig. 3.

Our apparatus may be used with any type of bulb blowing machine, such as the semi-automatic machine which delivers to the operator a blow pipe with the bulb attached to it, or the full automatic machine which delivers the bulb detached from the blow pipe.

A conveyor mechanism 10 is conveniently located and adapted to receive glass blanks such as electric incandescent lamp bulbs 11 as they are discharged from spindles 12 which form part of an automatic bulb blowing machine (not shown). The conveyor is supported by suitable framework 13 and consists of a travelling belt 14 which runs over the drums 15—16 mounted on shafts 17—18 which rest in the bearings 19—20 supported in the framework 13. The belt 14 is operated from an outside source such as a motor (not shown) through the chain 21, sprocket wheel 22 mounted on drum 16 and guided in its travel by means of the idlers 23—24.

After a freshly blown bulb 11 has been discharged from one of the spindles 12 it falls upon the belt 14 which carries it up an inclined way which terminates in a chute 25, said chute being constructed so as to direct the bulb down upon a second conveyor 26, as shown in Fig. 2. The latter consists of a pair of endless chain belts 27 spaced the proper distance apart so as to hold and carry the bulbs in a vertical position. As a bulb 11 rides off the belt 14 its top or rounded end falls between and upon the belts 27, which run over the sprocket wheels 28—29 and are continuously operated by means of the chain 21. The neck portion 30 of the bulb comprises at its end a thick ring or mass of glass which is of such weight and size as to cause the neck to swing by gravity down between the belts 27 thereby placing the bulb in a vertical position with its rounded or bowl end up as shown in dotted lines in Fig. 2. A bracket 31 which extends from the framework 13 adjustably supports the conveyor 26 through the hook-shaped rod 32 which carries the cross bar 33 extending between the uprights 34 attached to the conveyor which is pivotally mounted on the shaft 35 which rests in the bearings 36 of the framework 13. The conveyor 26 transports the bulbs to a feeding or loading mechanism which is located close to the delivery end thereof and comprises a continuously rotating carrier disc 37 provided with holders for receiving the bulbs. A convenient form of holder comprises a bulb receiving recess in the periphery of the disc and a guard for holding the bulb in the recess. The recess consists of a semispherical slot 38 of such size as to hold the body portion of the bulb properly. The guard 39 extends part way around the disc in order that the bulbs may be held in the slots 38, said guard being supported by rods 40 which extend from a holding bracket 41.

The disc 37 is mounted upon a hollow shaft 42 which extends through the bearings 43—44 supported in the holding bracket 41, said bracket being attached to a finishing machine 45 as shown in Fig. 1. The disc is continuously rotated by means of a gear 46 which meshes with gear 47 mounted on a shaft 48, said shaft carrying at its opposite end gear 49 which drives the chain of gears 50, all of which are mounted in bearings 51 formed by the holding bracket 41. One of the gears 50 meshes with gear $50^1$ which is mounted on the end of the hollow shaft 42. As the bulbs on the second conveyor reach the delivery end thereof, the foremost bulb is held back by the smooth periphery 52 of the disc 37 until a recess or slot 38 comes into alignment with said bulb whereupon it falls into the recess or slot and is carried in the direction of the arrow (A) to a point opposite the finishing machine 45 where it can be conveniently loaded into one of a number of holders carried by said finishing machine.

As shown in Fig. 1, as the bulbs reach position B, they are removed from the slots 38 and placed in the holders 53, said holders being carried by a continuously rotating turret 54 forming part of the glass finishing machine. The unloading of the bulbs is accomplished by means of fingers 55 which are pivotally mounted at 56 on the bottom of the disc 37 and held in position by means of springs 57. As a bulb reaches the unloading position, a curved portion 58 of a finger 55 rides up on the cam 59, thus forcing the finger outward which in turn gently pushes the bulb out of the slot 38 and into the holder 53 of the finishing machine. The cam 59 is slidably mounted upon a stationary member 60 and is constructed so as to avoid any breakage of bulbs which might occur at position B in case a bulb previously loaded into one of the holders 53 had not been removed. In this event, instead of forcing the finger outward, the cam 59 would move inward against the action of spring 61.

What we claim as new and desire to secure by Letters Patent of the United States is:—

1. In an apparatus for feeding glass bulbs and similar articles which comprise a bowl portion and a neck portion, the combination of a conveyor comprising a slot of such width that the neck portion of said article may swing therethrough by gravity and allow the article to be suspended by the bowl portion, means for moving said conveyor, a substantially horizontally disposed rotary member mounted below the discharge end of said conveyor and comprising peripheral pockets adapted to receive said articles as they are discharged from said conveyor and means for continuously rotating said member.

2. In an apparatus for feeding glass bulbs and similar articles which comprise a bowl portion and a neck portion, the combination of a conveyor comprising a slot of such width that the neck portion of said article may swing therethrough by gravity and allow the article to be suspended by the bowl portion, means for moving said conveyor, a substantially horizontally disposed rotary member mounted below the discharge end of said conveyor and comprising peripheral pockets adapted to receive said articles as they are discharged from said conveyor, means for continuously rotating said member and means for retaining said articles in said rotary member during a portion of its travel.

3. In an apparatus for feeding glass bulbs and similar articles which comprise a bowl portion and a neck portion, the combination of a conveyor comprising a slot of such width that the neck portion of said article may swing therethrough by gravity and allow the article to be suspended by the bowl portion, means for moving said conveyor, a substantially horizontally disposed rotary member mounted below the discharge end of said conveyor and comprising peripheral pockets adapted to receive said articles as they are discharged from said conveyor, means for continuously rotating said member and a guard surrounding a portion of said rotary member to retain said articles therein.

4. In an apparatus for feeding glass bulbs and similar articles which comprise a bowl portion and a neck portion, the combination of a conveyor comprising a slot of such width that the neck portion of said article may swing therethrough by gravity and allow the article to be suspended by the bowl portion and a substantially horizontally disposed rotary member mounted below the discharge end of said conveyor and comprising peripheral pockets adapted to receive said articles as they are discharged from said conveyor, an ejecting mechanism for each pocket and means for causing the same to operate at a desired point in the travel thereof.

5. In an apparatus for feeding glass bulbs and similar articles which comprise a bowl portion and a neck portion, the combination of a conveyor comprising a slot of such width that the neck portion of said article may swing therethrough by gravity and allow the article to be suspended by the bowl portion and a substantially horizontally disposed rotary member mounted below the discharge end of said conveyor and comprising peripheral pockets adapted to receive said articles as they are discharged from said conveyor, a finger pivotally mounted in each pocket and a cam for swinging said finger to eject an article at the desired point in the travel thereof.

6. In an apparatus for feeding glass bulbs and similar articles which comprise a bowl portion and a neck portion, the combination of a travelling conveyor upon which said articles may fall, a second conveyor disposed at the discharge end of said first conveyor and comprising a slot of such width that the neck portion may swing therethrough by gravity and allow the article to be suspended by the bowl portion in a substantially vertical position, means for moving said second conveyor, a substantially horizontally disposed rotary member mounted at the discharge end of said second conveyor and comprising peripheral pockets adapted to receive said articles as they are discharged from said second conveyor and means for continuously rotating said member.

7. In an apparatus for feeding glass bulbs and similar articles which comprise a bowl portion and a neck portion, the combination of a travelling conveyor upon which said articles may fall, a second conveyor having its receiving end disposed below the discharge end of said first conveyor and comprising a slot of such width that the neck portion may swing therethrough by gravity and allow the article to be suspended by the bowl portion in a substantially vertical position, means for moving said second conveyor, a substantially horizontally disposed rotary member mounted below the discharge end of said second conveyor and comprising peripheral pockets adapted to receive said articles as they are discharged from said second conveyor and means for continuously rotating said member.

In witness whereof we have hereunto set our hands this 20th day of March 1925.

CARL A. BROWN.
FRANK B. VAN SICKLE.